United States Patent
Kato

(10) Patent No.: US 9,353,693 B2
(45) Date of Patent: May 31, 2016

(54) VEHICLE CONTROL DEVICE

(75) Inventor: Hirokazu Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 13/819,654

(22) PCT Filed: Sep. 13, 2010

(86) PCT No.: PCT/JP2010/065736
§ 371 (c)(1),
(2), (4) Date: Feb. 27, 2013

(87) PCT Pub. No.: WO2012/035601
PCT Pub. Date: Mar. 22, 2012

(65) Prior Publication Data
US 2013/0173142 A1  Jul. 4, 2013

(51) Int. Cl.
*F02D 35/00* (2006.01)
*F02D 29/02* (2006.01)

(52) U.S. Cl.
CPC ................ *F02D 35/00* (2013.01); *F02D 29/02* (2013.01); *Y10S 903/903* (2013.01)

(58) Field of Classification Search
CPC .......... F02D 41/042; F02D 2041/0095; F02N 11/0814
USPC ....................................... 701/112; 417/44.11
See application file for complete search history.

(56) References Cited

U.S. PATENT DOCUMENTS

| | | | |
|---|---|---|---|
| 6,017,101 A | 1/2000 | Matsuda | |
| 6,275,759 B1 * | 8/2001 | Nakajima et al. | 701/54 |
| 6,434,475 B2 * | 8/2002 | Kaneko et al. | 701/112 |
| 6,482,127 B2 * | 11/2002 | Katou | 477/192 |
| 6,504,259 B1 * | 1/2003 | Kuroda et al. | 290/40 C |
| 6,616,413 B2 * | 9/2003 | Humpheries | F04B 17/04 417/413.1 |
| 6,702,718 B2 * | 3/2004 | Tani et al. | 477/203 |
| 7,115,068 B2 * | 10/2006 | Braun et al. | 477/99 |
| 7,558,666 B2 * | 7/2009 | DiGonis | 701/112 |

(Continued)

FOREIGN PATENT DOCUMENTS

| CN | 101545407 A | 9/2009 |
|---|---|---|
| JP | A-58-156454 | 9/1983 |

(Continued)

OTHER PUBLICATIONS

Sep. 2, 2015 Office Action issued in Chinese Patent Application No. 201080069071.7.

(Continued)

*Primary Examiner* — Stephen K Cronin
*Assistant Examiner* — Susan E Scharpf
(74) *Attorney, Agent, or Firm* — Oliff PLC

(57) ABSTRACT

A vehicle control device includes an engine that is a power source of a vehicle, an electrical storage device, a starting device connected to the electrical storage device and configured to consume electrical power to start the engine, and a power steering device connected to the electrical storage device and configured to consume electrical power to generate an assist torque, wherein an engine stop control of causing the engine to be in a stopped state is executable during travelling of the vehicle, and the engine stop control is prohibited in at least one of time of turning of the vehicle, time of steering of the vehicle during travelling, and time of generating an assist torque during travelling.

6 Claims, 8 Drawing Sheets

(56) References Cited

U.S. PATENT DOCUMENTS

| | | | |
|---|---|---|---|
| 2001/0025220 A1* | 9/2001 | Kaneko et al. | 701/112 |
| 2002/0046732 A1 | 4/2002 | Katou | |
| 2004/0028531 A1* | 2/2004 | Morikawa | B62D 5/0406 417/44.11 |
| 2006/0048734 A1* | 3/2006 | Kataoka | B60K 6/485 123/179.4 |
| 2007/0225882 A1* | 9/2007 | Yamaguchi et al. | 701/36 |
| 2007/0272187 A1 | 11/2007 | Celisse et al. | |
| 2009/0071745 A1* | 3/2009 | Itakura et al. | 180/446 |
| 2010/0094493 A1* | 4/2010 | Atsumi | B60K 6/28 701/22 |
| 2012/0029746 A1* | 2/2012 | Ito | F02D 29/02 701/22 |

FOREIGN PATENT DOCUMENTS

| | | |
|---|---|---|
| JP | H09142272 A | 6/1997 |
| JP | 2000-104629 A | 4/2000 |
| JP | 2001-098967 A | 4/2001 |
| JP | A 2001-159385 | 6/2001 |
| JP | 2002145035 A | 5/2002 |
| JP | A-2003-112539 | 4/2003 |
| JP | 2003-276631 A | 10/2003 |
| JP | 2004-173372 A | 6/2004 |
| JP | A-2005-132201 | 5/2005 |
| JP | 2005218251 A | 8/2005 |
| JP | A-2005-271640 | 10/2005 |
| JP | A-2005-351202 | 12/2005 |
| JP | 2006141156 A | 6/2006 |
| JP | 2006144718 A | 6/2006 |
| JP | 2007112345 A | 5/2007 |
| JP | 2007113524 A | 5/2007 |
| JP | 2008510926 A | 4/2008 |
| JP | A-2008-143483 | 6/2008 |
| JP | 2011-202616 A | 10/2011 |
| JP | B2-5035431 | 9/2012 |
| WO | 2006027512 A1 | 3/2006 |

OTHER PUBLICATIONS

Chen Quanshi as the Chief Editor. "Advanced Electric Vehicle Technology." Chemical Industry Press, Aug. 31, 2007, pp. 165-170.

* cited by examiner

VEHICLE CONTROL DEVICE

FIELD

The present invention relates to a vehicle control device.

BACKGROUND

A vehicle mounted with a power steering device is conventionally known. Patent Literature 1 discloses a technology of a control device of a hybrid vehicle including a means for calculating a consumption power amount by an electric power steering mechanism on a curve path, a means for calculating a regeneration power amount, which is generated with advancement into the curve path, and a determination means for determining whether or not to start an engine in a stopped state on the basis of the consumption power amount and the regeneration power amount.

Patent Literature 2 discloses a technique of activating an engine starting motor to start the engine when a load of a power steering motor is predicted to be in an overload state while the engine is stopped in an engine start/stop control device of a vehicle for stopping or starting the engine under a predetermined operating condition.

CITATION LIST

Patent Literature

Patent Literature 1: Japanese Patent Application Laid-open No. 2008-143483
Patent Literature 2: Japanese Patent Application Laid-open No. 2005-351202

SUMMARY

Technical Problem

In a vehicle mounted with a power steering device and capable of travelling with the engine stopped, the engine is sometimes automatically started by a starting device based on travelling conditions and the like while travelling with the engine stopped. In such a vehicle, if the power steering device and the starting device are operated by power from a common electrical storage device, a power supply request from the starting device and a power supply request from the power steering device with respect to the electrical storage device are sometimes made at the same time. The electrical storage device that can simultaneously supply power to the starting device and the power steering device thus becomes large capacity, and the large capacity electrical storage device may lead to an increase in weight, and the like. It is desirable to ensure the power supplying ability with respect to the power steering device during travelling, and to reduce the capacity of the electrical storage device.

It is an object of the present invention to provide a vehicle control device capable of ensuring the power supplying ability with respect to the power steering device and achieving smaller capacity of the electrical storage device in a vehicle, which includes the electrical storage device, the starting device, and the power steering device and which can execute an engine stop control of causing the engine to be in a stopped state during the travelling of the vehicle.

Solution to Problem

A vehicle control device according to the present invention includes an engine that is a power source of a vehicle; an electrical storage device; a starting device connected to the electrical storage device and configured to consume electrical power to start the engine; and a power steering device connected to the electrical storage device and configured to consume electrical power to generate an assist torque, wherein an engine stop control of causing the engine to be in a stopped state is executable during travelling of the vehicle, and the engine stop control is prohibited in at least one of time of turning of the vehicle, time of steering of the vehicle during travelling, and time of generating an assist torque during travelling.

In the vehicle control device, it is preferable that the prohibition of the engine stop control is determined on the basis of an assist current value of the power steering device.

In the vehicle control device, it is preferable that the engine stop control is prohibited when the assist current value exceeds a current value defined in advance.

In the vehicle control device, it is preferable that the engine stop control is prohibited on the basis of a changing speed of the assist current value.

In the vehicle control device, it is preferable that the power steering device generates the assist torque by an electric motor, and the engine stop control is preferably prohibited on the basis of a maximum output of the electric motor determined from an output voltage of the electrical storage device of when the engine was started in the past.

A vehicle control device according to the present invention includes an engine that is a power source of a vehicle; an electrical storage device; a starting device connected to the electrical storage device and configured to consume electrical power to start the engine; and a power steering device connected to the electrical storage device and configured to consume electrical power to generate an assist torque, wherein an engine stop control of causing the engine to be in a stopped state is executable during travelling of the vehicle, and the engine stop control is prohibited on the basis of power consumption of the power steering device predicted from a steering history.

In the vehicle control device, it is preferable that the steering history is a transition of an assist current value of the power steering device, and the engine stop control is preferably prohibited on the basis of a predicted value of the assist current value based on the transition.

In the vehicle control device, it is preferable that the power steering device generates the assist torque by an electric motor, the steering history is preferably a transition of an assist current value and a rotation speed of the electric motor, and the engine stop control is preferably prohibited on the basis of a maximum output of the electric motor determined from an output voltage of the electrical storage device of when the engine was started in the past, and a predicted value of the assist current value and a predicted value of the rotation speed of the electric motor based on the transition.

A vehicle control device according to the present invention includes an engine that is a power source of a vehicle; an electrical storage device; a starting device connected to the electrical storage device and configured to consume electrical power to start the engine; and a power steering device connected to the electrical storage device and configured to consume electrical power to generate an assist torque, wherein an engine stop control of causing the engine to be in a stopped state is executable during travelling of the vehicle, the engine stop control is prohibited on the basis of a comparison result of a physical quantity related to the assist torque and a threshold value, and the threshold value changes according to at least one of a steering state or a travelling state of the vehicle.

In the vehicle control device, it is preferable that the power steering device generates the assist torque by an electric motor, the physical quantity is preferably an assist current value of the electric motor, and the steering state is preferably a rotation speed of the electric motor.

In the vehicle control device, it is preferable that the physical quantity is an assist current value of the power steering device, and the travelling state is preferably a travelling speed of the vehicle.

Advantageous Effects of Invention

According to the vehicle control device of the present invention, an engine stop control of causing the engine to be in a stopped state is executable during travelling of the vehicle and the engine stop control is prohibited in at least one of time of turning of the vehicle, time of steering of the vehicle during travelling, and time of the assist torque generation during travelling under a situation where the engine is operated. Therefore, according to the vehicle control device of the present invention, the power supplying ability with respect to the power steering device can be ensured and smaller capacity of the electrical storage device can be achieved.

DESCRIPTION OF EMBODIMENTS

A vehicle control device according to embodiments of the present invention will be hereinafter described in detail with reference to the drawings. It should be noted that the present invention is not to be limited by the embodiments. Configuring elements in the following embodiments include elements that can be easily contrived by those skilled in the art and elements that are substantially the same.

(First Embodiment)

Figure 1:
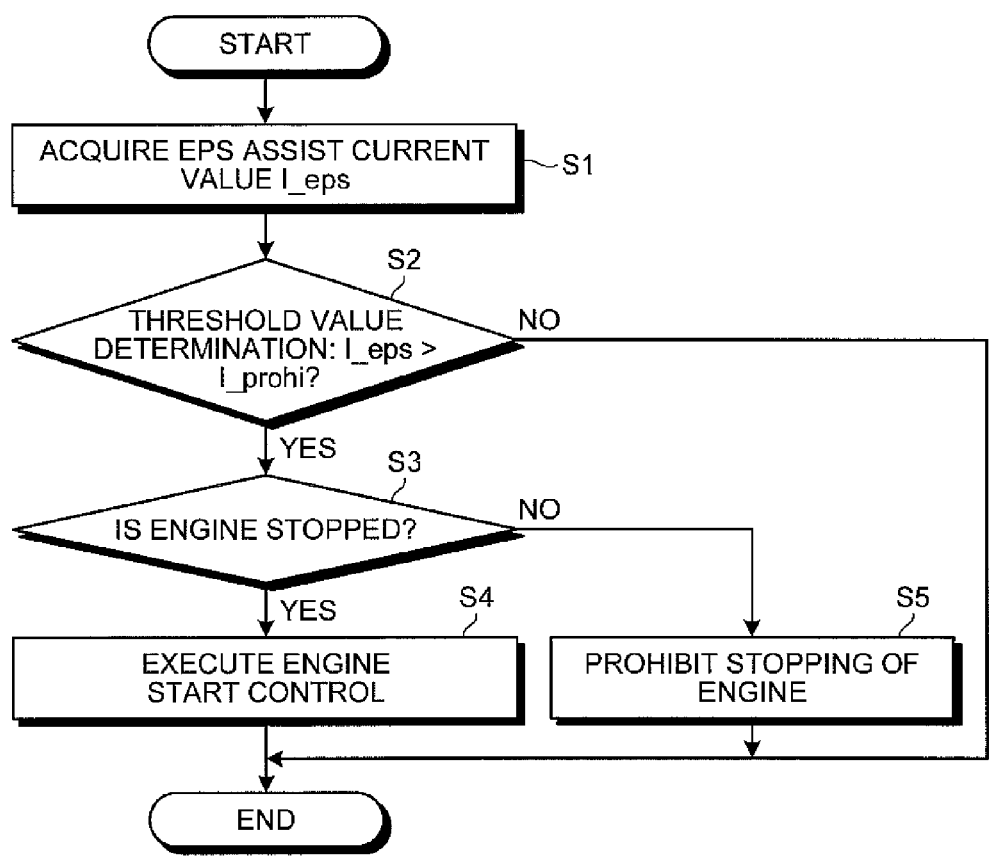
FIG. 1 is a flowchart illustrating an operation of a vehicle control device according to a first embodiment of the present invention.

A first embodiment will be described with reference to FIGS. 1 to 5. The present embodiment relates to a vehicle control device. FIG. 1 illustrates a flowchart of an operation of a vehicle control device according to the first embodiment of the present invention, FIG. 2 illustrates a schematic configuration diagram of a vehicle mounted with the vehicle control device according to the embodiment, and FIG. 3 illustrates a view of a steering mechanism and an EPS device.

A vehicle control device 1-1 of the present embodiment can execute an engine stop control of causing the engine to be in a stopped state during travelling of the vehicle in the vehicle mounted with a power steering device (EPS device). The power is supplied to the EPS device and a starter of the engine from a common battery. The voltage drop of the battery based on the power consumed by the starter at the time of engine start during the travelling needs to be taken into consideration from the standpoint of ensuring the power supplying ability with respect to the EPS device.

The vehicle control device 1-1 of the present embodiment prohibits the engine stop control on the basis of current or past operation of the EPS device. When the engine stop control is prohibited, the engine is prohibited from being stopped anew, and the engine in the stopped state is restarted. The power supplying ability with respect to the EPS device thus can be ensured, and the capacity of the battery can be reduced.

Figure 2:
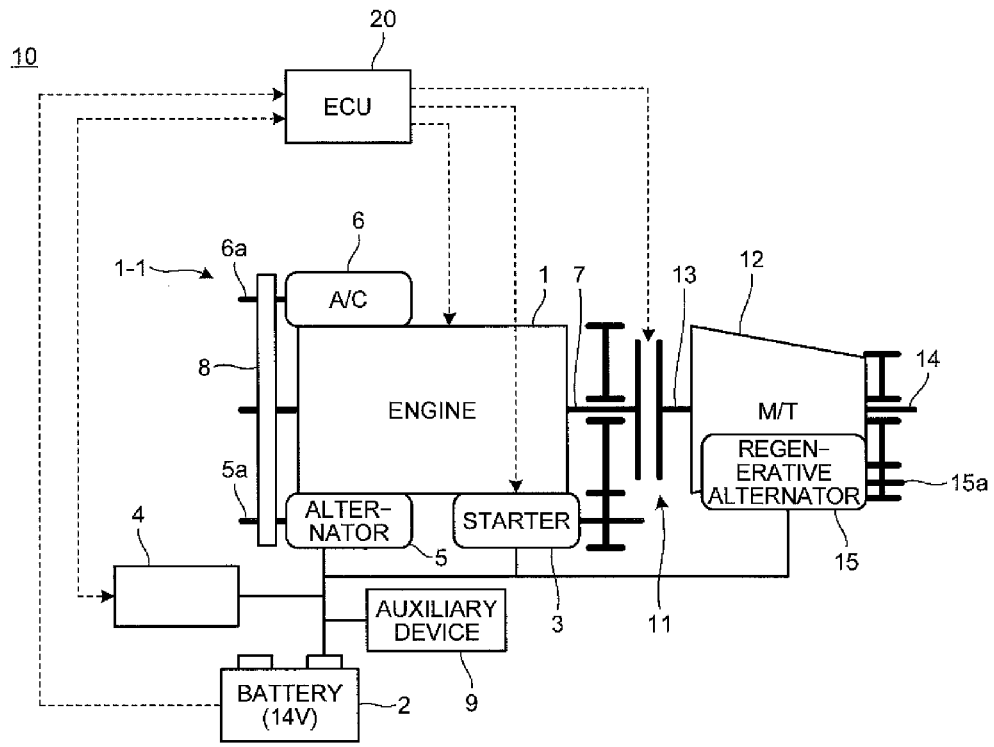
FIG. 2 is a schematic configuration diagram of a vehicle mounted with the vehicle control device according to the embodiment.
Figure 3:
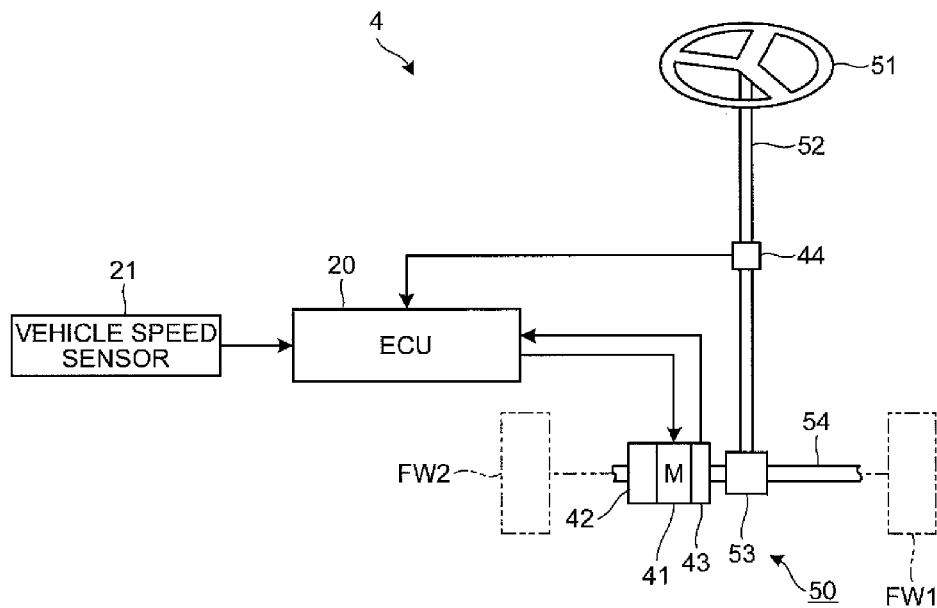
FIG. 3 is a view illustrating a steering mechanism and an EPS device.

The vehicle control device 1-1 illustrated in FIG. 2 includes an engine 1, a battery 2, a starter 3, an EPS device 4, and an ECU 20 mounted on a vehicle 10. The engine 1 is a power source of the vehicle 10. The battery 2 is an electrical storage device capable of charging and discharging. The battery 2 is, for example, a lead storage battery, and can supply power to the starter 3, the EPS device 4, an auxiliary device 9 other than the EPS device 4, and the like. The battery 2 can be charged by power generated by an alternator 5 or a regenerative alternator 15, to be described later.

The engine 1 includes the starter 3, the alternator 5, and a compressor 6 of an air conditioning device. The starter 3 is a starting device that consumes power to start the engine 1. The starter 3 has a motor (e.g., DC motor) capable of transmitting power to a crankshaft 7 of the engine 1, and starts the engine 1 by consuming power and rotating the motor. The starter 3 is electrically connected to the battery 2, the alternator 5, and the regenerative alternator 15, to be described later, and is able to receive supply of power from each of the battery 2, the alternator 5, and the regenerative alternator 15.

The alternator 5 is a power generator that generates power by rotating in conjunction with the rotation of the crankshaft 7. A rotation shaft 5a of the alternator 5, a rotation shaft 6a of the compressor 6, and the crankshaft 7 can transmit power via a belt 8. That is, the alternator 5 generates power from the power transmitted from the crankshaft 7 through the belt 8. The alternator 5 is connected to the battery 2, so that the power generated in the alternator 5 can be charged to the battery 2.

The crankshaft 7 of the engine 1 is connected to an input shaft 13 of a transmission 12 by way of a clutch 11. The transmission 12 can be gear changed manually by a gear-shifting operation of a driver. The power of the engine 1 input to the input shaft 13 of the transmission 12 is output to an output shaft 14. The rotation of the engine 1 is speed-changed by the transmission 12, and then transmitted to drive wheels of the vehicle 10 through the output shaft 14. The transmission 12 includes the regenerative alternator 15. A rotation shaft 15a of the regenerative alternator 15 is connected to the output shaft 14 of the transmission 12 by way of a gear. The regenerative alternator 15 generates power from the power transmitted from the output shaft 14 to the rotation shaft 15a. The regenerative alternator 15 generates power at the time of inertia travelling, for example. The power generated by the regenerative alternator 15 can be charged to the battery 2.

The clutch 11 is, for example, a friction engagement type clutch device. The clutch 11 connects or shields a transmission path of power between the engine 1 and the transmission 12 by engaging or disengaging. The clutch 11 engages or disengages when the driver operates a clutch pedal. The clutch 11 includes an actuator for switching between an engaged state and a disengaged state. The actuator switches the clutch 11 to the engaged state or the disengaged state by driving the clutch 11 by electromagnetic force, hydraulic pressure, or the like, for example.

The ECU 20 is an electronic control unit including a computer, for example. The ECU 20 is connected to the engine 1, the starter 3, the EPS device 4, and the clutch 11, respectively, and controls the engine 1, the starter 3, the EPS device 4, and the clutch 11. The ECU 20 is connected to the battery 2 to monitor the state of the battery 2. The ECU 20 is, for example, connected to a voltage sensor for detecting a voltage value of the battery 2 and a sensor for detecting current value or liquid temperature of the battery 2, respectively, and can acquire a signal indicating each detection result.

The EPS device 4 is a power steering device that is connected to the battery 2, and that consumes power to generate an assist torque. As illustrated in FIG. 3, the EPS device 4 includes an electric motor 41, a ball screw mechanism 42, a rotation angle sensor 43, and a torque sensor 44 assembled to a steering mechanism 50. The steering mechanism 50 is a mechanism for steering left and right front wheels FW1, FW2 according to the rotating operation on a steering wheel 51. The steering mechanism 50 includes a steering shaft 52, a pinion gear 53, and a rack bar 54, in addition to the steering wheel 51. The steering shaft 52 has an upper end coupled to the steering wheel 51 and a lower end coupled to the pinion gear 53, respectively. The pinion gear 53 gears with rack teeth formed on the rack bar 54 to form a rack-and-pinion mechanism. The front wheels FW1, FW2 are connected to both ends of the rack bar 54, respectively, by way of a tie rod, a knuckle arm, and the like. The left and right front wheels FW1, FW2 are steered according to displacement in an axis line direction of the rack bar 54.

The electric motor 41 of the EPS device 4 is assembled to the rack bar 54. A DC motor, for example, is used for the electric motor 41. The rotation shaft of the electric motor 41 is connected to be able to transmit power to the rack bar 54 through the ball screw mechanism 42. The electric motor 41 assists the steering operation of the driver by transmitting the power to the rack bar 54. That is, the electric motor 41 applies the assist torque, which assists the steering force of the driver, on the steering mechanism 50. The ball screw mechanism 42 decelerates the rotation of the electric motor 41 and converts the rotation to linear motion to transmit to the rack bar 54. The electric motor 41 may be assembled to the steering shaft 52 instead of the rack bar 54 to transmit the power to the steering shaft 52.

The steering shaft 52 includes the torque sensor 44. The torque sensor 44 detects the steering torque generated in the steering shaft 52 such as the torque to be input to the steering shaft 52 by the rotating operation (steering operation) with respect to the steering wheel 51. The torque sensor 44 is connected to the ECU 20, and the steering torque detected by the torque sensor 44 is output to the ECU 20.

The electric motor 41 includes the rotation angle sensor 43. The rotation angle sensor 43 can detect a rotation angle position of a rotor of the electric motor 41. The rotation angle sensor 43 is connected to the ECU 20, and a signal indicating the rotation angle position detected by the rotation angle sensor 43 is output to the ECU 20. The ECU 20 can calculate the rotation angle and the rotation angular speed of the electric motor 41 based on the detected rotation angle position. In the following description, the rotation angular speed of the electric motor 41 is simply referred to as "rotation speed".

The rotation angle of the electric motor 41 corresponds to the steering angle of the steering wheel 51, and the rotation speed of the electric motor 41 corresponds to the steering angular speed of the steering wheel 51. In the present embodiment, the steering angular speed of the steering wheel 51 is also referred to as "steering wheel speed". The electric motor 41 is connected to the ECU 20 to be controlled by the ECU 20. The ECU 20 can detect an assist current value, which is a driving current value of the electric motor 41. The assist current value is a current value supplied to the electric motor 41 by a drive circuit of the electric motor 41, and is proportional to an output torque of the electric motor 41. The assist current value is, for example, detected by a current sensor provided in the drive circuit.

Figure 4:
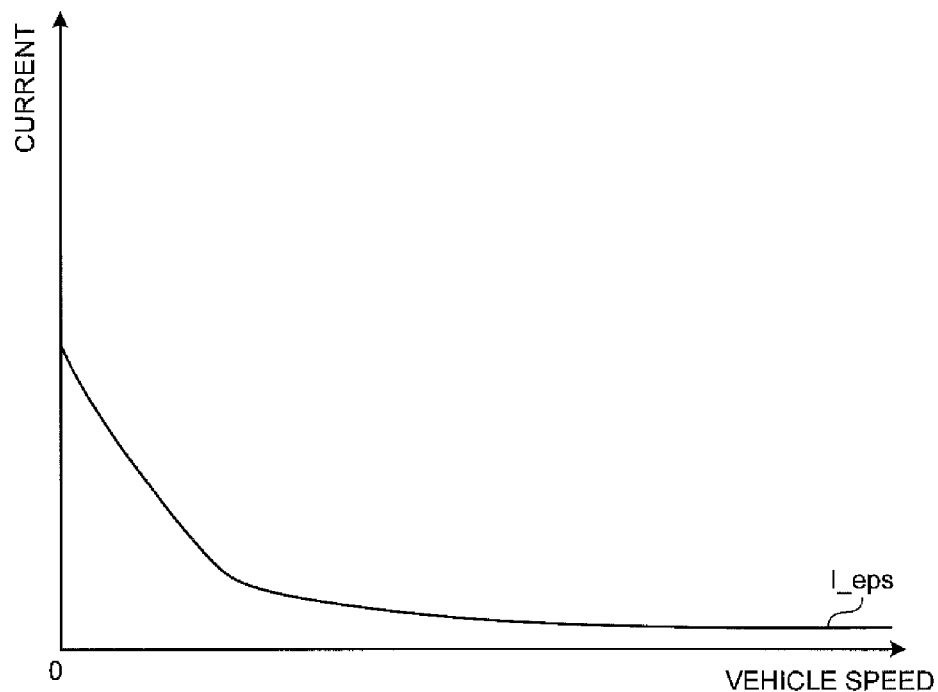
FIG. 4 is a view illustrating one example of a relationship between a vehicle speed and an assist current value.

A vehicle speed sensor 21 is connected to the ECU 20. A signal indicating the vehicle speed detected by the vehicle speed sensor 21 is output to the ECU 20. The ECU 20 has a function serving as a control unit for controlling the EPS device 4. The ECU 20 determines the assist torque based on the steering torque detected by the torque sensor 44 and the vehicle speed detected by the vehicle speed sensor 21. The ECU 20 stores a correspondence relationship of the vehicle speed and the steering torque, and the assist torque as a map, or the like in advance. The ECU 20 calculates a target value of the assist torque to be generated by the electric motor 41 based on the map. FIG. 4 is a view illustrating one example of a relationship between the vehicle speed and the assist current value (assist torque) in a predetermined steering torque. As illustrated in FIG. 4, the assist torque at low vehicle speed is a larger torque than the assist torque at high vehicle speed. This is based on the difference in the magnitude of the resistance force on steering, for example.

The ECU 20 calculates the target value of the assist current value corresponding to the target value of the assist torque. The ECU 20 feedback controls the assist current value to realize the calculated target value of the assist current value.

The ECU 20 has a function serving as a control unit for controlling the engine 1. The ECU 20 can execute the engine stop control of causing the engine 1 to be in the stopped state during the travelling of the vehicle 10. The ECU 20 executes the engine stop control when an executable condition of the engine stop control defined in advance is met during the travelling of the vehicle 10. When executing the engine stop control, the ECU 20 stops the supply of fuel to the engine 1 and controls the clutch 11 to the disengaged state. The rotation of the engine 1 stops when the fuel supply to the engine 1 is stopped and the clutch 11 is in the disengaged state thus shielding the transmission path of the power between the engine 1 and the drive wheel. That is, when the engine stop control is executed, the engine 1 enters the stopped state and the vehicle 10 travels. A state in which the engine brake does not applied is realized when the drive wheel is separated from the engine 1, whereby the drive wheel is in the free-run state. The fuel economy can be improved by executing the engine stop control. The executable condition of the engine stop control includes, for example, a condition of being at a time of inertia travelling in which the acceleration is turned OFF and the vehicle 10 travels by inertia.

The ECU 20 terminates the engine stop control when the executable condition of the engine stop control is no longer met during the execution of the engine stop control. The ECU 20 terminates the engine stop control when the acceleration is turned ON during the execution of the engine stop control, for example. When terminating the engine stop control, the ECU 20 starts the engine 1 with the starter 3 and causes the clutch 11 to be in the engaged state after the starting of the engine 1 is completed. A free-run S & S control in which stopping and restarting of the engine are automatically carried out during the travelling has advantages in the fuel economy effect, low cost, and the like.

When attempting to realize a system of automatically stopping and restarting the engine during the travelling at low cost, it is advantageous to supply the power of all auxiliary devices including the EPS device 4 and the power of the starter 3 from one power supply (lead battery, etc.). In the system of supplying power from the common power supply to the auxiliary devices including the EPS device 4 and the starter 3, it is necessary to take into consideration the lowering of the battery voltage due to large current consumption of the starter 3. For example, there is a possibility the power supply request of the EPS device 4 and the power supply request of the starter 3 are made at the same time. Even if the power supply request of the EPS device 4 and the power supply request of the starter 3 are made independent from each other, the capacity of the power supply that can simultaneously supply power to both becomes large, and such large capacity power supply leads to increase in cost and increase in weight. It is desirable that the power supplying ability with respect to the EPS device 4 is ensured during the travelling and the capacity of the battery 2 is reduced.

The vehicle control device 1-1 of the present embodiment prohibits the engine stop control at least in one of time of turning of the vehicle 10, time of steering of the vehicle 10 during the travelling, or time of assist torque generation during the travelling. The time of turning of the vehicle 10 refers to when the vehicle 10 is travelling in a direction other than a straight-ahead direction, and includes travelling through a curve, making left or right turns, changing lanes, and the like. That is, the time of turning is the time of travelling in which the vehicle 10 travels with the steering wheel of the vehicle 10 steered to the left or the right with respect to a neutral state.

The time of steering of the vehicle 10 is when the steering wheel 51 is steered. That is, the time of steering includes a case where a force in the rotation direction is acting on the steering wheel 51, and a case where a torque is acting on the steering shaft 52.

The time of assist torque generation is when the EPS device 4 is generating the assist torque. The time of assist torque generation includes a case where the assist torque is being generated regardless of whether or not the driver is performing the steering operation. For example, the time of assist torque generation also includes a case where the assist torque is generated by a force acting on the steering wheel from a road surface when the driver is holding the steering wheel 51.

The vehicle control device 1-1 of the present embodiment prohibits the engine stop control on the basis of a comparison result of a physical quantity related to the assist torque and a threshold value. The engine stop control can be appropriately prohibited at the time of turning of the vehicle 10, the time of steering of the vehicle 10 during the travelling, and the time of assist torque generation during the travelling according to the determination made based on the physical quantity related to the assist torque. In the present embodiment, an EPS assist current value I_eps corresponds to the physical quantity related to the assist torque, but is not limited thereto.

Figure 5:
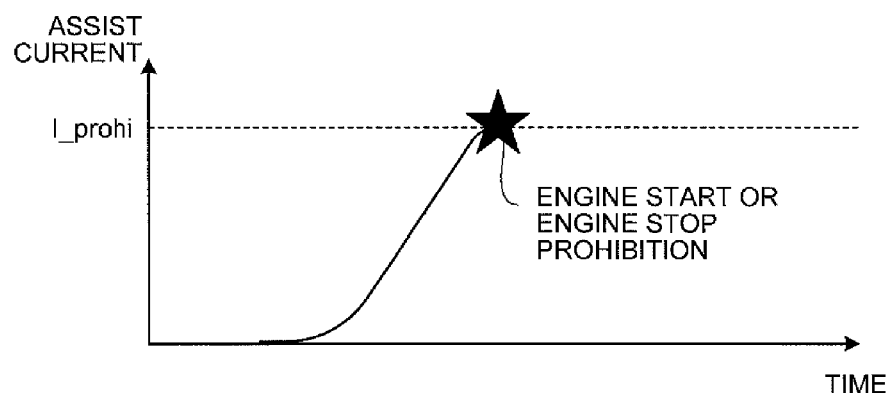
FIG. 5 is a view explaining a control of the first embodiment.

The operation of the present embodiment will be described with reference to FIGS. 1 and 5. FIG. 5 is a view explaining the control of the present embodiment. In FIG. 5, the horizontal axis indicates time and the vertical axis indicate assist current. The control flow illustrated in FIG. 1 is repeatedly executed during the travelling of the vehicle 10, for example.

First, in step S1, the ECU 20 acquires the EPS assist current value I_eps, which is the assist current value of the EPS device 4. The ECU 20 acquires the EPS assist current value I_eps detected in the electric motor 41 from the sensor.

In step S2, the ECU 20 carries out the threshold value determination. The ECU 20 carries out the determination of step S2 based on a comparison result of the EPS assist current value I_eps acquired in step S1 and a threshold value I_prohi defined in advance. The threshold value I_prohi is the threshold value of the assist current value. Positive determination is made in step S2 when the EPS assist current value I_eps is greater than the threshold value I_prohi.

The positive determination in step S2 corresponds to the time of turning of the vehicle 10, the time of steering of the vehicle 10 during the travelling, and the time of assist torque generation during the travelling. That is, the threshold value I_prohi may be a threshold value for determining whether or not the time of turning of the vehicle 10, the threshold value for determining whether or not the time of steering of the vehicle 10, the threshold value for determining whether or not the time of assist torque generation, or the threshold value common to a plurality of the above. For example, the threshold value I_prohi may be defined by an adaptability test for every type of vehicle.

The threshold value I_prohi may be, for example, a very small value that can be assumed as zero or substantially zero. By way of example, the threshold value I_prohi may be a value having a magnitude of an extent the hunching in which ON (permit) and OFF (prohibit) of the engine stop control are frequently switched during the direct advancement travelling can be suppressed. As the driver holds the steering wheel 51 during the travelling, the slight assist current sometimes flows even if the driver does not have the intention to steer at the time of the direct advancement travelling. The engine stop control may be set not to be prohibited with such weak assist current value. At least one of the time of turning of the vehicle 10, the time of steering of the vehicle 10, or the assist torque generation then can be appropriately determined, and the engine stop control can be prohibited.

For instance, if the vehicle control device 1-1 prohibits the engine stop control at the time of the turning of the vehicle 10, the engine stop control can always be prohibited when the vehicle 10 is turning even slightly. If the engine stop control is prohibited when the EPS assist current value I_eps is detected even slightly, the power supply request by the starter 3 and the power supply request by the EPS device 4 can be prevented in advance from being made at the same time.

The threshold value I_prohi may be set so that the engine stop control is not prohibited even if the driver carries out the steering operation if the steering torque is small. For example, a slight steering operation is sometimes performed to travel while maintaining to be in the same lane when traveling a linear road. The steering torque in such steering is smaller than the steering torque at the time of right turn or left turn, the time of changing lanes, and the like. The threshold value I_prohi is assumed as the assist current value between the assist current value, which flows in the steering to maintain the lane, and the assist current value, which flows in the steering of left or right turns, changing lanes, and the like. If the determination of step S2 is made by such threshold value I_prohi, the period to execute the engine stop control can be extended and the fuel economy can be improved.

The threshold value I_prohi is defined within a range of the current value smaller than the permitted maximum current. The permitted maximum current may be set to the current value that can be supplied to the EPS device 4 even if voltage reduction of the battery 2 occurs while the engine 1 is started by the starter 3, for example.

If determined that the EPS assist current value I_eps is greater than the threshold value I_prohi as a result of the determination of step S2 (Yes in step S2), the process proceeds to step S3, and if not (No in step S2), the control flow is terminated.

In step S3, the ECU 20 determines whether or not the engine is stopped. If determined that the engine is stopped as a result of the determination (Yes in step S3), the process proceeds to step S4, and if not (No in step S3), the process proceeds to step S5.

In step S4, the ECU 20 carries out the engine start control. The ECU 20 starts the engine 1, which is stopped in the engine stop control. The engine 1 is thereby started by the starter 3 when the EPS assist current value I_eps is a small current value. The power supplying ability with respect to the EPS device 4 is thus ensured. Furthermore, the capacity of the battery 2 can be reduced compared to the capacity that is necessary when the power supply request of the EPS device 4 and the power supply request of the starter 3 are made independently from each other. After step S4 is executed, the present control flow is terminated.

In step S5, the ECU 20 prohibits the engine stop control. That is, the engine 1 is prohibited from being stopped during the travelling while the positive determination is made in step S2. The power supply request by the EPS device 4 and the power supply request by the starter 3 are thus suppressed in advance from being made at the same time. For example, the power supply request by the EPS device 4 and the power supply request by the starter 3 can be suppressed in advance from being made at the same time when the EPS device 4 requests for a large power, that is, when a large assist torque is required. After step S5 is executed, the present control flow is terminated.

According to the vehicle control device 1-1 of the present embodiment, the engine stop control is prohibited at least during one of the time of turning of the vehicle 10, the time of steering of the vehicle 10 during the travelling, or the time of assist torque generation during the travelling. The engine 1 is thus operated at the time of the activation of the EPS device 4 during the travelling, and the power generated by the alternator 5 is supplied to the EPS device 4. The lowering in the charging amount of the battery 2 is thereby suppressed, and enhancement in the power supplying ability with respect to the EPS device 4 and reduction in the capacity of the battery 2 can both be achieved.

The prohibition of the engine stop control is determined on the basis of the EPS assist current value I_eps. The vehicle control device 1-1 can appropriately detect the time of turning of the vehicle 10, the time of steering, and the time of assist torque generation, and prohibit the stopping of the engine 1. The vehicle control device 1-1 prohibits the engine stop control when the EPS assist current value I_eps is greater than the threshold value I_prohi, which is a current value defined in advance. The engine 1 can be suppressed from being restarted frequently based on the slight EPS assist current value I_eps generated at the time of travelling by appropriately setting the threshold value I_prohi. Furthermore, the starting and stopping of the engine 1 can be suppressed from being repeated frequently by appropriately setting the threshold value I_prohi.

If the EPS assist current value I_eps lowers to be equal to or lower than the threshold value I_prohi after the engine stop control is prohibited on the basis of the EPS assist current value I_eps, the prohibition of the engine stop control is cancelled. The threshold value of when making the determination to cancel the prohibition of the engine stop control may be a value different from the threshold value I_prohi of when determining the prohibition of the engine stop control. The threshold value of when making the cancel determination may be a value smaller than the threshold value I_prohi of when making the prohibiting determination.

Figure 6:
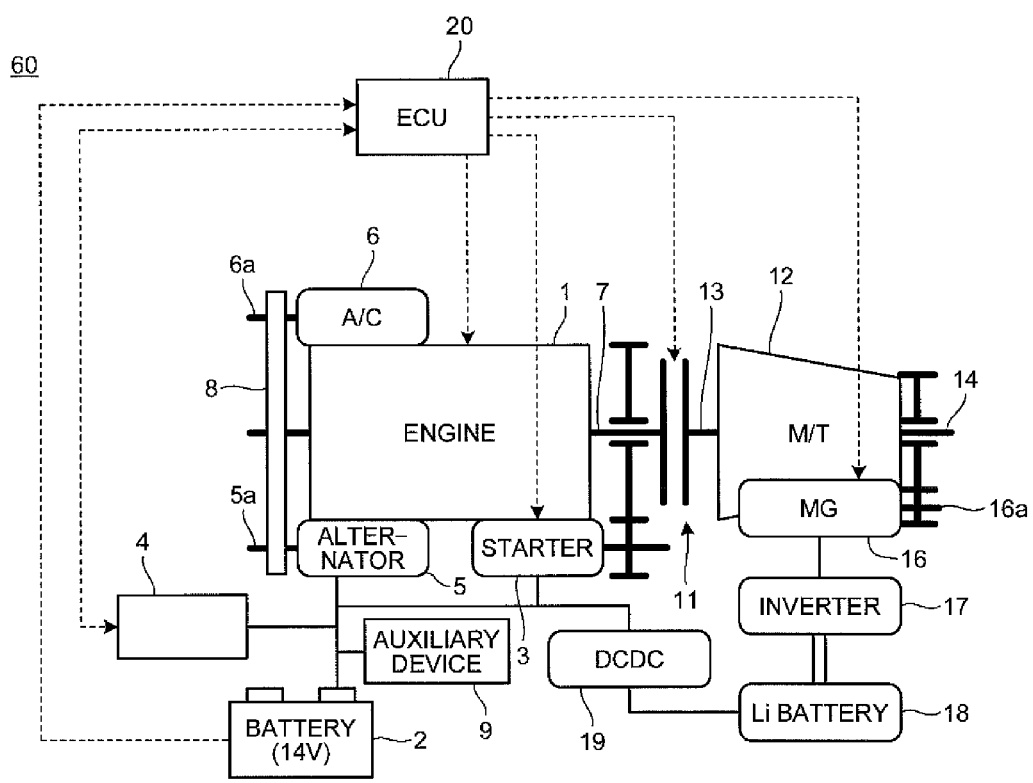
FIG. 6 is a view illustrating an example of a manual gear shift type hybrid vehicle.

The vehicle control device 1-1 may be applied to a manual gear shift type hybrid vehicle (MT-HV). FIG. 6 is a view illustrating one example of a manual gear shift type hybrid vehicle. A hybrid vehicle 60 includes a motor generator (hereinafter referred to as "MG") 16 in place of the regenerative alternator 15 of the vehicle 10 illustrated in FIG. 2. The MG 16 has both a function (power function) of an electric motor driven by the supply of power and a function (regenerative function) of a power generator for converting the machine energy to the electric energy. An AC synchronous type motor generator, for example, may be used for the MG 16. A rotation shaft 16a of the MG 16 is coupled to the output shaft 14 of the transmission 12 by way of a gear. The power output by the MG 16 is transmitted from the rotation shaft 16a to the output shaft 14 through the gear to drive the hybrid vehicle 60.

The MG 16 is connected to a lithium battery 18 by way of an inverter 17. The output voltage of the lithium battery 18 is higher than the output voltage of the battery 2. The lithium battery 18 is connected to the battery 2, the starter 3, the EPS device 4, and the like by way of a converter 19. The converter 19 is a DC-DC converter, and is adapted to drop the voltage of the lithium battery 18 and output the same toward the battery 2.

The hybrid vehicle 60 can selectively carry out the engine travelling of travelling by the power of the engine 1 and the EV travelling of travelling by the power of the MG 16. The travelling mode is switched by operating a shift lever, for example. The shift lever can be switched to the range for the EV travelling in addition to the range for the engine travelling. The ECU 20 is connected to a shift position sensor for detecting the shift position of the shift lever. The ECU 20 travels the hybrid vehicle 60 by the power of the engine 1 when the shift lever is operated to the range for the engine travelling. In the engine travelling, assist of power by the MG 16 and regenerative power generation by the MG 16 may be carried out.

When the driver operates the shift lever to the range for the EV travelling, the clutch 11 is disengaged by a mechanism that operates in conjunction with the shift lever. The ECU 20 shifts from the engine travelling mode to the EV travelling mode when detected that the driver operated the shift lever to the range for the EV travelling. After shifting to the EV travelling mode, the ECU 20 stops the engine 1 and travels the hybrid vehicle 60 by the power output by the MG 16.

In the engine travelling mode, the ECU 20 can execute the engine stop control. The ECU 20 terminates the engine stop control when the executable condition of the engine stop control is no longer met during the execution of the engine stop control. The voltage reduction of the battery 2 occurs in the hybrid vehicle 60 when restarting the engine 1. Although the power can be supplied from the lithium battery 18 to the starter 3, and the like through the converter 19, it is not enough to satisfy the requested power of the starter 3. It is difficult in terms of cost to provide a large capacity converter 19 that can satisfy the requesting power of the starter 3 when starting the engine. The capacity of the converter 19 is an extent of providing one part of the requesting power of the auxiliary device 9, for example, and voltage reduction occurs in the battery 2 when starting the engine.

The ECU 20 determines whether or not to prohibit the engine stop control on the basis of the EPS assist current value I_eps in the engine travelling mode. Thus, the power supplying ability with respect to the EPS device 4 during the travelling can be ensured and the capacity of the battery 2 can be reduced in the manual gear shift type hybrid vehicle 60.

The ECU 20 may determine whether or not to permit the stopping of the engine on the basis of the EPS assist current value I_eps when shifting from the engine travelling mode to the EV travelling mode by the operation of the shift lever.

The vehicle to which the vehicle control device 1-1 can be applied is not limited to those described in the present embodiment. For example, in the present embodiment, the transmission 12 is a manual transmission, but the transmission 12 may be an automatic transmission.

In the present embodiment, a case in which the engine stop control is automatically executed by the ECU 20 has been described, but this is not the sole case. For example, the engine stop control may be carried out manually (operation of the driver). The engine stop control may be executed based on an operation input on a switch, or the like operated by the driver. In such a vehicle, the stopping of the engine is prohibited even if the operation input requesting the execution of the engine stop control is made if the engine stop control is prohibited by the ECU 20 on the basis of the EPS assist current value I_eps.

The prohibition of the engine stop control by the vehicle control device 1-1 of the present embodiment can be applied not only to the power steering device, but to a device that consumes power and assists the operation of the driver.

(Second Embodiment)

Figure 7:
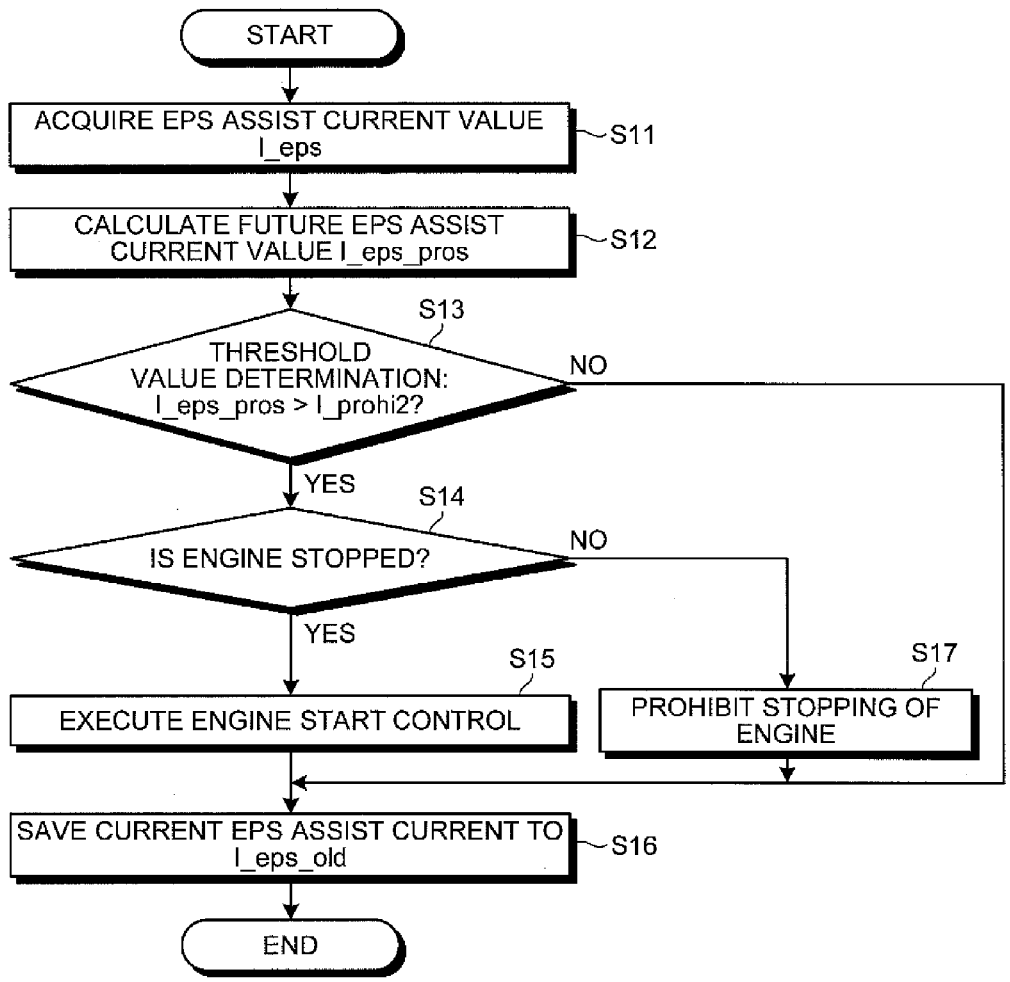
FIG. 7 is a flowchart illustrating an operation of a second embodiment.
Figure 8:
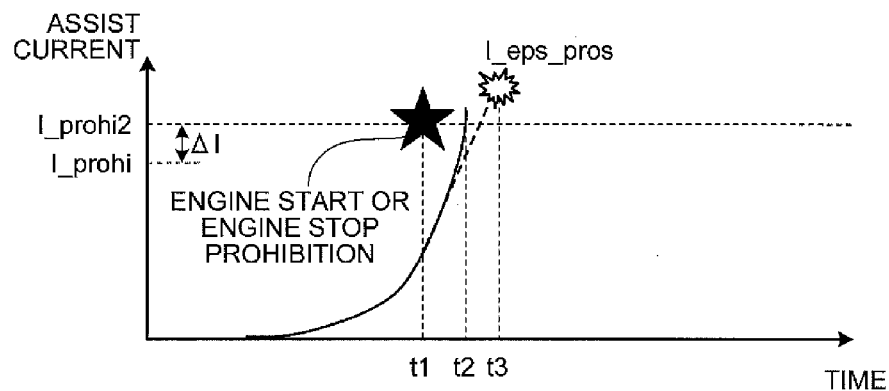
FIG. 8 is a view explaining a control of the second embodiment.

A second embodiment will be described with reference to FIGS. 7 and 8. In the second embodiment, the same reference numerals are denoted on the configuring elements having similar functions as those described in the above embodiment, and redundant description will be omitted. FIG. 7 is a flowchart illustrating the operation of the second embodiment, and FIG. 8 is a view explaining the control of the second embodiment. The vehicle control device of the present embodiment has configuring elements similar to those of the vehicle control device 1-1 (e.g., FIGS. 2 and 3) of the first embodiment.

The present embodiment differs from the first embodiment in that whether or not to prohibit the engine stop control is determined on the basis of a future EPS assist current value I_eps_pros, which is a predicted value of the EPS assist current value I_eps. The future EPS assist current value I_eps_pros is predicted based on a steering history. The steering history is a past history of a physical quantity indicating the steering state and the turning state, and indicates the transition of the physical quantity up to the present in a series of steering and turning, for example. In the present embodiment, the future EPS assist current value I_eps_pros is calculated based on the transition of the EPS assist current value I_eps, as an example of the steering history.

The control flow illustrated in FIG. 7 is repeatedly executed during the travelling, and is repeatedly executed in a predefined interval, for example.

First, in step S11, the ECU 20 acquires the EPS assist current value I_eps.

In step S12, the ECU 20 calculates the future EPS assist current value I_eps_pros. The ECU 20 calculates the future EPS assist current value I_eps_pros with equation (1) below, for example.

$$I\_eps\_pros = I\_eps + (I\_eps - I\_eps\_old) \quad (1)$$

I_eps_old is the EPS assist current value I_eps in the past, that is, a past EPS assist current value. The past EPS assist current value I_eps_old is, for example, the EPS assist current value I_eps acquired in step S11 when the present control flow is executed the previous time.

In step S13, the ECU 20 carries out the threshold value determination. The ECU 20 carries out the determination of step S13 based on a comparison result of the future EPS assist current value I_eps_pros calculated in step S12 and a threshold value I_prohi2 defined in advance. The threshold value I_prohi2 is the threshold value of the assist current value. The threshold value I_prohi2 is a value greater than the threshold value I_prohi of the first embodiment, for example.

By way of example, the threshold value I_prohi2 may be defined based on the threshold value I_prohi of the first embodiment and an execution interval T_int of the present control flow. The execution interval T_int is, for example, an interval of the execution start timing of the previous control flow and the execution start timing of the current control flow. The threshold value I_prohi2 may be defined, for example, based on a sum of an amount of increase of an average assist current value in the execution interval T_int and the threshold value I_prohi. Thus, even if the EPS assist current value I_eps already reached the threshold value I_prohi, the engine stop control can be continued if it is not predicted to increase up to the threshold value I_prohi2 thereafter. Therefore, according to the vehicle control device of the present embodiment, a period in which the engine stop control can be executed can be extended.

If the future EPS assist current value I_eps_pros is greater than the threshold value I_prohi2, a positive determination is made in step S13. In FIG. 8, at a time point of time t1, determination is made that the future EPS assist current value I_eps_pros becomes greater than the threshold value I_prohi2 at future time t3. If the future EPS assist current value I_eps_pros is determined to be greater than the threshold value I_prohi2 as a result of the determination of step S13 (Yes in step S13), the process proceeds to step S14, and if not (No in step S13), the process proceeds to step S16.

In step S14, the ECU 20 determines whether or not the engine is stopped. If determined that the engine is stopped as a result of the determination (Yes in step S14), the process proceeds to step S15, and if not (No in step S14), the process proceeds to step S17.

In step S15, the ECU 20 performs the engine start control. The ECU 20 starts the engine 1 that is stopped in the engine stop control. The engine stop control thus can be prohibited at time t1, which is before the time t2 at which the actual EPS assist current value I_eps reaches the threshold value I_prohi2. The power supplying ability with respect to the EPS device 4 can be ensured by terminating the engine stop control being executed and starting the engine 1. Furthermore, the capacity of the battery 2 can be reduced than when the control of the present embodiment is not performed. After step S15 is executed, the process proceeds to step S16.

In step S16, the ECU 20 saves the current EPS assist current value I_eps in the past EPS assist current value I_eps_old. That is, the value of the past EPS assist current value I_eps_old is updated by the value of the EPS assist current value I_eps acquired in step S11. After step S16 is executed, the present control flow is terminated.

In step S17, the ECU 20 prohibits the stopping of the engine. The engine 1 is prohibited from being stopped during travelling while positive determination is being made in step S13. After step S17 is executed, the process proceeds to step S16.

In the present embodiment, an example in which the power consumption by the EPS device 4 predicted from the steering history is the future EPS assist current value I_eps_pros has been described by way of example, but this is not the sole case. For example, the consumed power of the EPS device may be predicted based on the steering history.

The determination based on the future EPS assist current value I_eps_pros of the present embodiment and the determination based on the EPS assist current value I_eps of the first embodiment may be executed in combination. For example, the engine stop control may be prohibited when at least one of either a first condition, in which the EPS assist current value I_eps is greater than the threshold value I_prohi, or a second condition, in which the future EPS assist current value I_eps_pros is greater than the threshold value I_prohi2, is met. In step S13, for example, a positive determination may be made when at least one of either the first condition or the second condition is met, and a negative determination may be made when neither the first condition nor the second condition is met.

(Variant of Second Embodiment)

A variant of the second embodiment will now be described. In the present variant, the determination on whether or not to prohibit the engine stop control in the second embodiment also takes into consideration the slope (changing speed) of the EPS assist current value I_eps.

The slope of the EPS assist current value I_eps (hereinafter simply referred to as "slope of current value") I'_eps is calculated according to the following equation (2), for example.

$$I'\_eps = (I\_eps - I\_eps\_old)/T\_sam \quad (2)$$

Here, T_sam is the sampling time of the EPS assist current value I_eps. The sampling time T_sam may be, for example, a sampling interval of the EPS assist current value I_eps by the ECU 20.

The threshold value for the slope I'_eps of the current value is a threshold value I'_eps_prohi of the slope of the current value. When the slope I'_eps of the current value is greater than the threshold value I'_eps_prohi of the slope, a third condition, which is a prohibiting condition of the engine stop control based on the slope I'_eps of the current value, is met. The threshold value I'_eps_prohi of the slope is greater than zero, that is, a slope indicating increase of the EPS assist current value I_eps. The ECU 20 determines whether or not to prohibit the engine stop control on the basis of the future EPS assist current value I_eps_pros and the slope I'_eps of the current value. The ECU 20, for example, prohibits the engine stop control when at least one of either the second condition or the third condition is met.

Furthermore, the prohibiting determination of the engine stop control may be made on the basis of the EPS assist current value I_eps. For example, the engine stop control may be prohibited when at least one of the first condition, the second condition, or the third condition is met. If the engine stop control is performed based on the slope I'_eps of the current value, the engine stop control can be prohibited when the EPS assist current value I_eps greatly increases even if the engine stop control is not prohibited in the determination based on the EPS assist current value I_eps or the future EPS assist current value I_eps_pros. For example, the engine stop control can be prohibited preliminarily in a case when a sudden steering wheel operation is performed.

In the above determination, the first condition, the second condition, and the third condition may be weighted. For example, the first condition to the third condition may be weighted in accordance with the travelling condition such as the vehicle speed.

The prohibiting determination of the engine stop control may be made based on changes in the slope I'_eps of the current value in place of or in addition to the slope I'_eps of the current value. For example, the engine stop control may be prohibited when the slope I'_eps of the current value is in a predetermined increasing tendency or more.

The threshold value I'_eps_prohi of the slope may be varied. For example, the threshold value I'_eps_prohi of the slope may be defined based on the transition of the slope I'_eps of the current value in the past steering operation of the driver. By way of example, the threshold value I'_eps_prohi of the slope can be defined based on the slope I'_eps of the average current value in the past steering operation. The engine stop control thus can be appropriately prohibited with respect to the steering operation of turning the steering wheel 51 larger and faster than in the normal steering operation.

Threshold value determination of the slope I'_eps of the current value may be made at the rise of the EPS assist current value I_eps, for example. The slope I'_eps of the current value at the rise of the EPS assist current value I_eps sometimes may differ depending on the content of the steering operation. For example, the relationship between the slope I'_eps of the current value at the rise of the EPS assist current value I_eps and the subsequent transition of the EPS assist current value I_eps may be learned, and whether or not to prohibit the engine stop control may be determined based on the learning result and the detected slope I'_eps of the current value at rising.

As described above, the vehicle control device of the present variant prohibits the engine stop control on the basis of the slope I'_eps of the current value, which is the changing speed of the EPS assist current value I_eps. Thus, the prohibiting determination based on change in the turning state of the vehicle, change in the steering state, change in the assist torque, and the like can be carried out by determining whether or not to prohibit the engine stop control on the basis of the state of change of the EPS assist current value I_eps.

(Third Embodiment)

Figure 9:
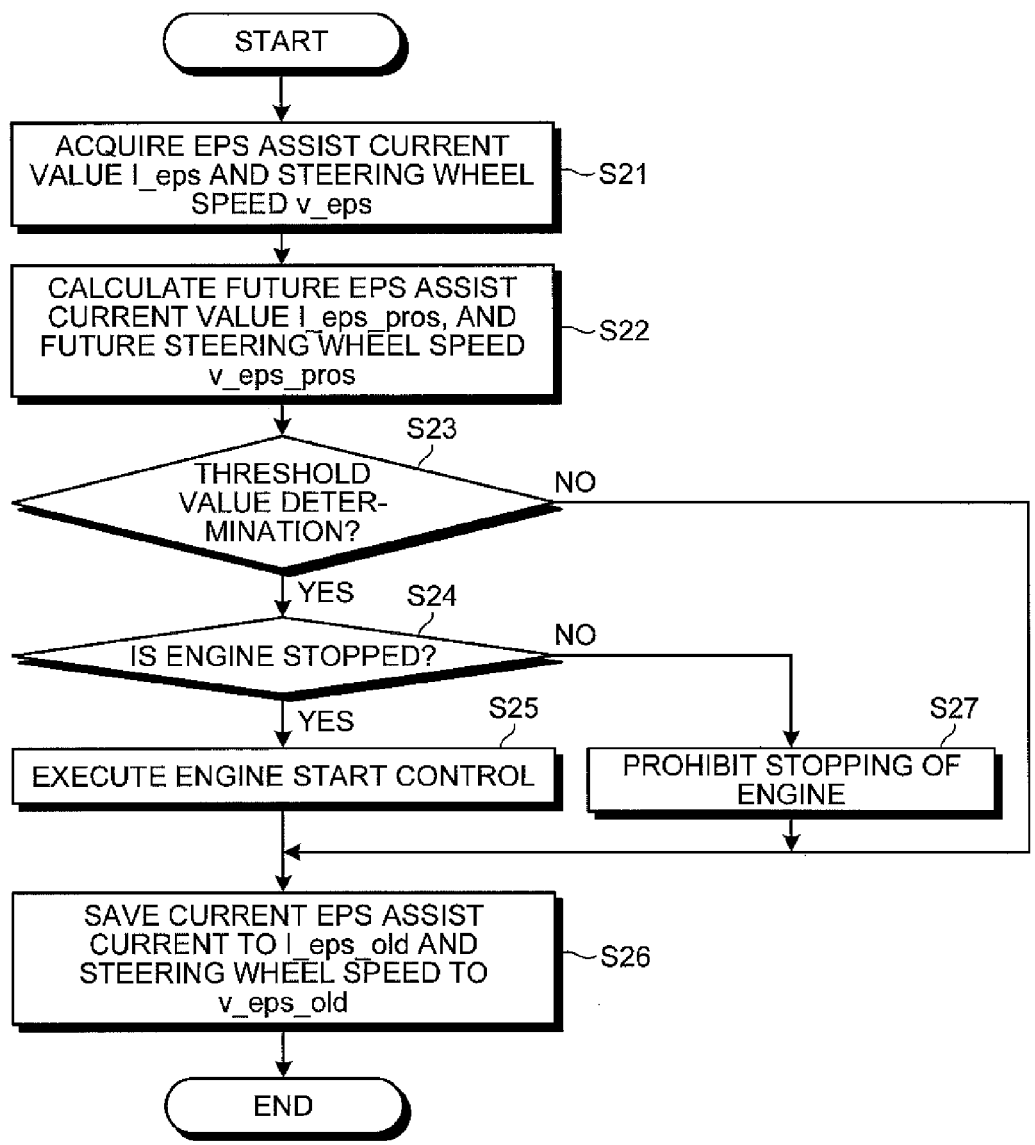
FIG. 9 is a flowchart illustrating an operation of a third embodiment.
Figure 10:
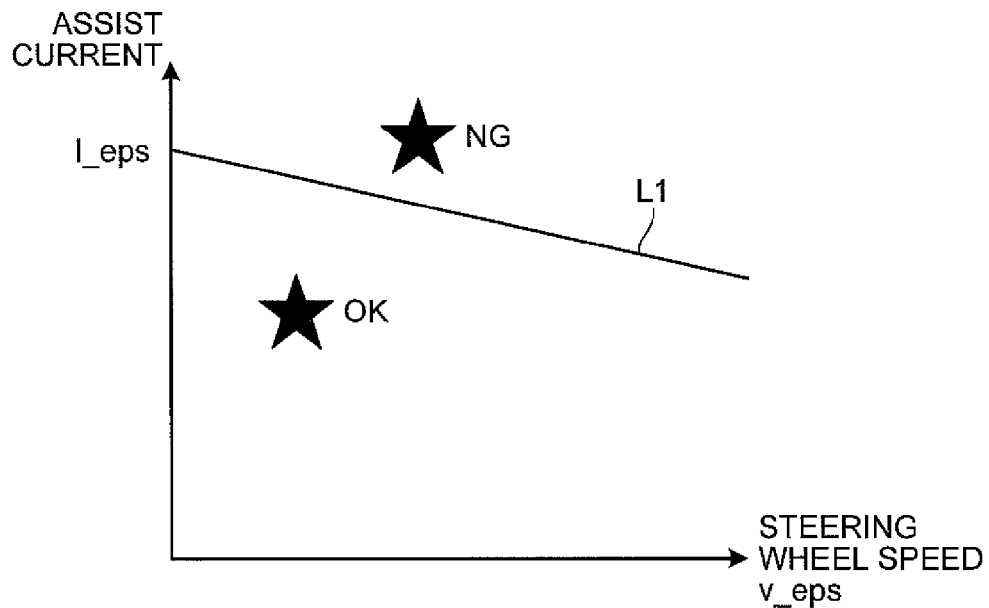
FIG. 10 is a view explaining a control of the third embodiment.

A third embodiment will be described with reference to FIGS. 9 and 10. In the third embodiment, the same reference numerals are denoted on the configuring elements having similar functions as those described in the above embodiments, and redundant description will be omitted. FIG. 9 is a flowchart illustrating the operation of the present embodiment, and FIG. 10 is a view explaining the control of the present embodiment. The vehicle control device of the present embodiment may have configuring elements similar to those of the vehicle control device 1-1 (e.g., FIGS. 2 and 3) of the first embodiment.

The present embodiment differs from the embodiments described above in that whether or not to prohibit the engine stop control is determined based on a characteristic line (output line) of the electric motor 41. In the present embodiment, the prohibiting determination of the engine stop control is made based on a characteristic line L1 of the electric motor 41 illustrated in FIG. 10. In FIG. 10, the horizontal axis indicates the speed of the steering wheel and the vertical axis indicates the assist current value, respectively. The operating point of the electric motor 41 is indicated with each point on a plane having the speed of the steering wheel on the horizontal axis and the assist current value on the vertical axis. The speed of the steering wheel is in a proportional relationship with the rotation speed of the electric motor 41. The assist current value is in a proportional relationship with the assist torque. That is, FIG. 10 illustrates the relationship between the rotation speed of the electric motor 41 and the assist torque.

The characteristic line L1 illustrated in FIG. 10 indicates the correspondence relationship between the speed of the steering wheel and the assist current value at a predetermined supply voltage. The electric motor 41 can operate at an operating point on the origin side of the characteristic line L1 at the supply voltage smaller than the predetermined supply voltage. In other words, the supply voltage greater than the predetermined supply voltage is required to operate the electric motor 41 at the operating point on the side opposite to the origin side of the characteristic line L1. That is, the characteristic line L1 is a maximum output line indicating the maximum output that can be output by the electric motor 41 when the maximum suppliable voltage is the predetermined supply voltage. The characteristic line L1 has a slope in which the assist current value lowers with increase in the speed of the steering wheel.

The characteristic line L1 that becomes the threshold value for carrying out the prohibiting determination of the engine stop control in the present embodiment is defined based on the output voltage of the battery 2 when the engine 1 is started in the past. In this case, the characteristic line L1 indicates the maximum output of the electric motor 41 determined from the output voltage of the battery 2 of when the engine 1 is started in the past. The characteristic line L1, for example, is defined based on a minimum value of the output voltage of the battery 2 of when the engine 1 is stated in the past. In other words, whether or not to prohibit the engine stop control is determined based on the characteristic line L1 corresponding to the minimum value of the magnitude of the voltage supplied to the EPS device 4 when the engine 1 is started in the past.

The characteristic line L1 can be calculated based on the characteristic line of the design value, for example. For instance, if the characteristic line at the supply voltage of 12V is expressed as with the following equation (3), the characteristic line at the supply voltage of 6V is obtained with the following equation (4).

$$I\_eps = k1 \times v\_eps + K2 \quad (3)$$

$$I\_eps = k1 \times v\_eps + K2 \times 6/12 \quad (4)$$

Here, k1, K2 are coefficients indicating the characteristics of the electric motor 41. Furthermore, v_eps is the speed of the steering wheel.

In FIG. 10, the region on the origin side of the characteristic line L1 is the engine stop permitted region in which the engine stop control is not prohibited. The region on the characteristic line L1 and the side opposite to the origin side of the characteristic line L1 is the engine stop prohibited region, in which the engine stop control is prohibited. In the present embodiment, the ECU 20 prohibits the engine stop control if the predicted operating point of the electric motor 41 is in the engine stop prohibited region. The predicted operating point is the operating point of the electric motor 41 determined by the future EPS assist current value I_eps_pros and the future steering wheel speed v_eps_pros.

The future steering wheel speed v_eps_pros is the predicted value of the steering wheel speed based on the transition of the steering wheel speed v_eps. The future steering wheel speed v_eps_pros corresponds to the predicted value of the rotation speed of the electric motor 41. The future steering wheel speed v_eps_pros can, for example, be calculated with the following equation (5).

$$v\_eps\_pros = v\_eps + (v\_eps - v\_eps\_old) \quad (5)$$

Here, v_eps_old is the speed of the steering wheel in the past, that is, the past steering wheel speed. The past steering wheel speed v_eps_old is, for example, the steering wheel speed v_eps acquired in step S21 when the control flow illustrated in FIG. 9 is executed the previous time.

The operation of the present embodiment will be described with reference to FIG. 9. First, in step S21, the ECU 20 acquires the EPS assist current value I_eps and the steering wheel speed v_eps. The ECU 20 calculates the steering wheel speed v_eps based on the rotation angle position of the electric motor 41 acquired from the rotation angle sensor 43.

In step S22, the ECU 20 calculates the future EPS assist current value I_eps_pros and the future steering wheel speed v_eps_pros. The future EPS assist current value I_eps_pros is calculated according to equation (1) and the future steering wheel speed v_eps_pros is calculated according to equation (5), respectively.

In step S23, the ECU 20 performs the threshold value determination. The ECU 20 makes a positive determination in step S23 if the predicted operating point, which is determined by the future EPS assist current value I_eps_pros and the future steering wheel speed v_eps_pros calculated in step S22, is in the engine stop prohibited region. If the predicted operating point is in the engine stop permitted region, on the other hand, negative determination is made in step S23. The process proceeds to step S24 if positive determination is made in step S23 (Yes in step S23), and if not (No in step S23), the process proceeds to step S26.

In step S24, the ECU 20 determines whether or not the engine is stopped. If determined that the engine is stopped (Yes in step S24) as a result of the determination, the process proceeds to step S25, and if not (No in step S24), the process proceeds to step S27.

In step S25, the ECU 20 performs the engine start control. The engine 1 is then restarted and the power supplying ability with respect to the EPS device 4 is ensured. After step S25 is executed, the process proceeds to step S26.

In step S26, the ECU 20 saves the current EPS assist current value I_eps in the past EPS assist current value I_eps_old, and the steering wheel speed v_eps in the past steering wheel speed v_eps_old, respectively. The ECU 20 updates the past EPS assist current value I_eps_old with the EPS assist current value I_eps acquired in step S21, and updates the past steering wheel speed v_eps_old with the steering wheel speed v_eps acquired in step S21. After step s26 is executed, the present control flow is terminated.

In step S27, the ECU 20 prohibits the stopping of the engine. The engine 1 is prohibited from being stopped during travelling while the positive determination is being made in step S23. After step S27 is executed, the process proceeds to step S26.

The prohibiting determination may be made on the basis of the current operating point of the electric motor 41 and the characteristic line L1 in place of or in addition to making the prohibiting determination of the engine stop control on the basis of the predicted operating point and the characteristic line L1. For example, even if the current operating point is in the engine stop permitted region, the engine stop control may be prohibited if it is in a region close to the characteristic line L1. By way of example, a determination line parallel to the characteristic line L1 may be defined on the origin side of the characteristic line L1, and the engine stop control may be prohibited if the current operating point is in a region between such determination line and the characteristic line L1. That is, the vehicle control device of the present embodiment prohibits the engine stop control on the basis of the characteristic line L1, the EPS assist current value I_eps, and the rotation speed of the electric motor 41, where the EPS assist current value I_eps and the rotation speed of the electric motor 41 may be based on the current value, the past value, or the predicted value.

(Variant of Third Embodiment)

In the third embodiment, the threshold value determination may be further made based on a slope v'_eps of the steering wheel speed v_eps. The slope v'_eps of the steering wheel speed can be calculated with the following equation (6), for example.

$$v'\_eps=(v\_eps-v\_eps\_old)/T\_sam\_v \quad (6)$$

Here, T_sam_v is a sampling time of the steering wheel speed v_eps. The sampling time T_sam_v is a sampling interval of the steering wheel speed v_eps by the ECU 20, for example.

The ECU 20 carries out the threshold value determination based on the slope v'_eps of the steering wheel speed in addition to the threshold value determination based on the predicted operating point of the third embodiment, and determines whether or not to prohibit the engine stop control. The ECU 20, for example, determines to prohibit the stopping of the engine if the predicted operating point is in the engine stop prohibited region and the slope v'_eps of the steering wheel speed is greater than the threshold value v'_eps_prohi. The threshold value v'_eps_prohi is greater than zero, that is, a value indicating increase of the steering wheel speed v_eps, for example. The prohibiting determination of the engine stop control may be made based only on the slope v'_eps of the steering wheel speed.

(Fourth Embodiment)

Figure 11:
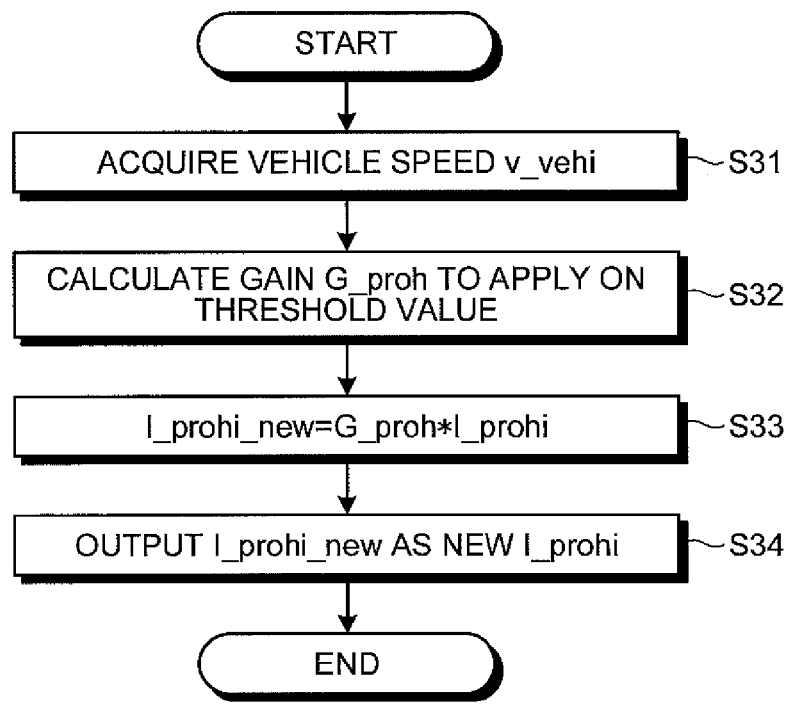
FIG. 11 is a flowchart illustrating a flow of threshold value calculation.
Figure 12:
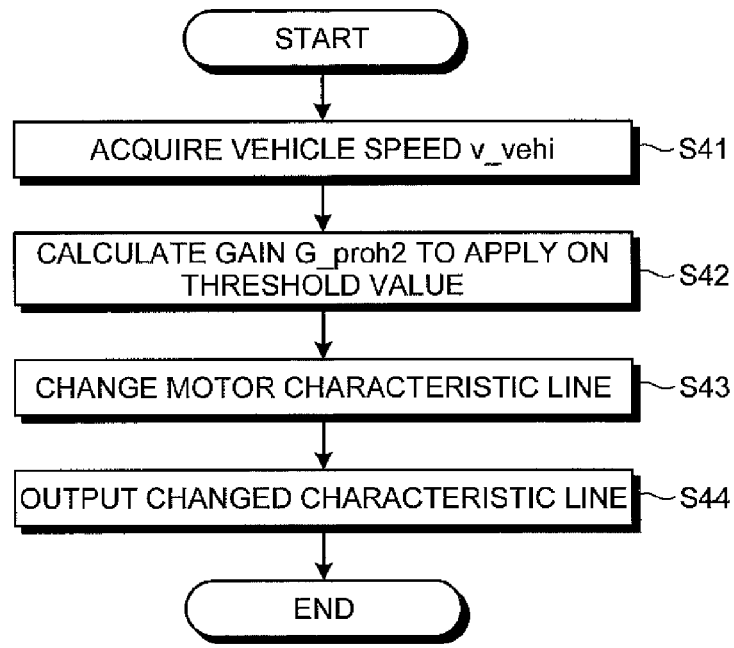
FIG. 12 is another flowchart illustrating the flow of threshold calculation.
Figure 13:
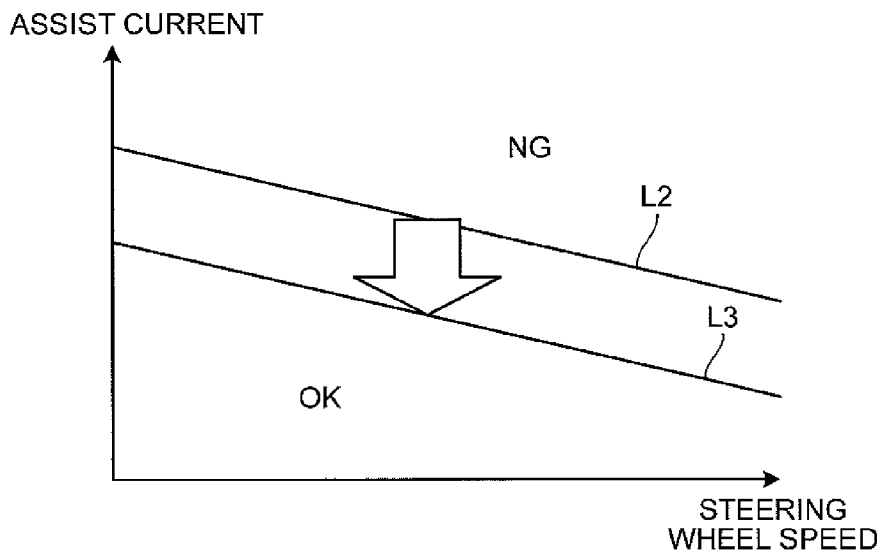
FIG. 13 is a view illustrating changes in a characteristic line by the threshold value calculation.

A fourth embodiment will be described with reference to FIGS. 11 to 13. In the fourth embodiment, the same reference numerals are denoted on the configuring elements having similar functions as those described in the above embodiments, and redundant description will be omitted. FIG. 11 is a flowchart illustrating flow of threshold value calculation, FIG. 12 is another flowchart illustrating the flow of threshold calculation, and FIG. 13 is a view illustrating changes in the characteristic line by the threshold value calculation. The vehicle control device of the present embodiment may have configuring elements similar to those of the vehicle control device 1-1 (e.g., FIG. 2 and FIG. 3) of the first embodiment.

The vehicle control device of the present embodiment differs from the embodiments described above in that the threshold value in the prohibiting determination of the engine stop control is changed according to the vehicle speed. As illustrated in FIG. 4, the assist current value changes according to the vehicle speed. The assist current value tends to be low when the vehicle speed is high than when the vehicle speed is low. That is, even if assist of a similarly large steering amount or steering speed is required, the EPS assist current value I_eps becomes lower in the case of high vehicle speed than in the case of low vehicle speed. Therefore, if the threshold value in the prohibiting determination of the engine stop control is constant regardless of the speed, the prohibiting determination becomes difficult to carry out in the case of high vehicle speed than in the case of low vehicle speed. If the threshold value is uniformly defined with the high vehicle speed as a reference, the engine stop control is frequently prohibited at the time of low vehicle speed, and sufficient fuel economy effect becomes difficult to achieve.

In the present embodiment, the threshold value in the prohibiting determination of the engine stop control changes in accordance with at least one of the steering state or the travelling state of the vehicle. In the present embodiment, the threshold value changes in accordance with the vehicle speed, which is an example of the travelling state of the vehicle. The prohibiting determination of the engine stop control thus can be more appropriately carried out at each vehicle speed.

One example of a threshold value calculation will be described with reference to FIG. 11. The control flow illustrated in FIG. 11 is, for example, repeatedly executed at a predefined interval during the travelling of the vehicle. The ECU 20 performs the prohibiting determination of the engine stop control on the basis of the threshold value updated as needed by the threshold value calculation illustrated in FIG. 11.

First, in step S31, the ECU 20 acquires the vehicle speed v_vehi. The ECU 20 acquires the vehicle speed v_vehi detected by the vehicle speed sensor 21.

In step S32, the ECU 20 calculates a gain G_proh to apply on the threshold value. The gain G_proh is, for example, calculated with the following equation (7).

$$G\_proh=1/v\_vehi \quad (7)$$

According to equation (7), the gain G_proh is a value inversely proportional to the vehicle speed v_vehi.

In step S33, the ECU 20 calculates a variable I_prohi_new. A product of the gain G_proh that is calculated in step S32 and the threshold value I_prohi that becomes the basis is substituted to the variable I_prohi_new. The threshold value I_prohi that becomes the basis is, for example, the threshold value I_prohi at a predetermined vehicle speed v_vehi, and is, for example the threshold value I_prohi at the vehicle speed v_vehi=0.

In step S34, the ECU 20 outputs the variable I_prohi_new as a new threshold value I_prohi. The ECU 20 substitutes the variable I_prohi_new calculated in step S33 for the threshold value I_prohi. After step S34 is executed, the threshold value calculation is terminated.

In the above description, the threshold value I_prohi for the prohibiting determination of the engine stop control based on the EPS assist current value I_eps is calculated, but a threshold value I_prohi2 of the future EPS assist current value I_eps_pros can also be similarly calculated. In other words, in step S33, a product of the gain G_proh that is calculated in step S32 and the threshold value I_prohi2 that becomes the basis is substituted to the variable I_prohi2_new, and the variable I_prohi2_new may be output as the new threshold value I_prohi2 in step S34. The threshold value I_prohi2 that becomes the basis is the threshold value I_prohi2 at a predetermined vehicle speed v_vehi, and is, for example, the threshold value I_prohi2 at the vehicle speed v_vehi=0.

The threshold value calculation is carried out as illustrated in FIG. 12 for the threshold value determination based on the characteristic line of the third embodiment. In the threshold value determination based on the characteristic line, the vehicle speed corresponds to the travelling state and the rotation speed of the electric motor 41 corresponds to the steering state, respectively. The threshold value of the EPS assist current value I_eps changes in accordance with the steering wheel speed v_eps, which is proportional to the rotation speed of the electric motor 41, and the vehicle speed, respectively.

First, in step S41, the ECU 20 acquires the vehicle speed v_vehi.

In step S42, the ECU 20 calculates a gain G_proh2 to apply on the threshold value. The gain G_proh2 may be calculated similar to the gain G_proh, for example.

In step S43, the ECU 20 changes the motor characteristic line. As will be described below with reference to FIG. 13, for example, the motor characteristic line can be changed by multiplying the gain G_proh2 to a value of intercept of the characteristic line.

In FIG. 13, reference numeral L2 indicates the characteristic line that becomes the basis and reference numeral L3 indicates the characteristic line after the change. The characteristic line that becomes the basis is the characteristic line at the predetermined vehicle speed v_vehi, and is the characteristic line at the vehicle speed v_vehi=0, for example. If the characteristic line L2 that becomes the basis can be expressed with the following equation (8), the characteristic line L3 after the change can be expressed with the following equation (9). In equation (8) and equation (9), the second term on the right side indicates the intercept of the vertical axis, that is, the intercept of the assist current value I_eps axis.

$$I\_eps = L1 \times v\_eps + L2 \quad (8)$$

$$I\_eps = L1 \times v\_eps + L2 \times G\_prohi2 \quad (9)$$

In step S44, the ECU 20 outputs the changed motor characteristic line. The ECU 20 carries out the threshold value determination based on the predicted operating point on the basis of the characteristic line that is updated as needed. After step S44 is executed, the threshold value calculation is terminated.

The threshold value of the EPS assist current value I_eps with respect to a predetermined steering wheel speed v_eps changes by changing the characteristic line according to the vehicle speed. The characteristic lines L2, L3 have a slope in which the EPS assist current value I_eps reduces with increase in the steering wheel speed v_eps, so that the threshold value of the EPS assist current value I_eps changes according to the steering wheel speed v_eps. Therefore, in the threshold value determination based on the characteristic line, the threshold value changes in accordance with the steering state.

As described above, according to the present embodiment, the threshold value in the prohibiting determination of the engine stop control changes based on the vehicle speed. Thus, the engine stop control is appropriately carried out in accordance with the travelling state of the vehicle to improve the fuel economy, and the engine stop control is appropriately prohibited to ensure the power supplying ability on the EPS device 4. The threshold value in the prohibiting determination of the engine stop control changes according to the steering wheel speed v_eps. Thus, the engine stop control can be appropriately executed and the engine stop control can be appropriately prohibited according to the steering state. According to the vehicle control device of the present embodiment, the ensuring of the power supplying ability with respect to the EPS device 4 and the improvement of the fuel economy can both be achieved to a maximum extent while reducing the capacity of the battery 2.

The contents disclosed in the embodiments described above can be appropriately combined and executed.

INDUSTRIAL APPLICABILITY

The vehicle control device according to the present invention can carry out the starting determination of the engine according to the operation and the consumed power of the power steering device, and the status of the vehicle that changes from hour to hour, and thus is suited for achieving both ensuring of the power supplying ability with respect to the power steering device and the reduction of the capacity of the electrical storage device.

REFERENCE SIGNS LIST 1-1 vehicle control device
1 engine
2 battery
3 starter
4 EPS device
10 vehicle
20 ECU
41 electric motor
43 rotation angle sensor
44 torque sensor
51 steering wheel
I_eps EPS assist current value
I_eps_old past EPS assist current value
I_eps_pros future EPS assist current value
I_prohi, I_prohi2 threshold value
I'_eps slope
v_eps steering wheel speed
v_eps_old past steering wheel speed
v_eps_pros future steering wheel speed
v'_eps slope of steering wheel speed
v_vehi vehicle speed

The invention claimed is:

1. A vehicle control device comprising:
an engine that is a power source of a vehicle;
an electrical storage device that is configured to he capable of charging and discharging;
a starting device connected to the electrical storage device and configured to consume electrical power supplied from the electrical storage device to start the engine; and
a power steering device connected to the electrical storage device and configured to consume electrical power supplied from the electrical storage device to generate an assist torque, wherein
an engine stop control of causing the engine to be in a stopped state is executable during travelling of the vehicle,
the engine stop control is prohibited in at least one of time of turning of the vehicle, time of steering of the vehicle during travelling, and time of generating an assist torque during travelling under a situation where the engine is not stopped,
the engine stop control is determined on a basis of an assist current value of the power steering device,
the power steering device generates the assist torque by an electric motor, and
the engine stop control is prohibited on the basis of a maximum output of the electric motor determined from an output voltage of the electrical storage device of when the engine was started in the past.

2. The vehicle control device according to claim 1, wherein the engine stop control is prohibited when the assist current value exceeds a current value defined in advance.

3. The vehicle control device according to claim 1, wherein the engine stop control is prohibited on the basis of a changing speed of the assist current value.

4. A vehicle control device comprising:
an engine that is a power source of a vehicle;
an electrical storage device that is configured to be capable of charging and discharging;
a starting device connected to the electrical storage device and configured to consume electrical power supplied from the electrical storage device to start the engine; and
a power steering device connected to the electrical storage device and configured to consume electrical power supplied from the electrical storage device to generate an assist torque, wherein
an engine stop control of causing the engine to be in a stopped state is executable during travelling of the vehicle, the vehicle control device predicts power consumption of the power steering device from a past steering history, and the engine stop control is prohibited on a basis of the predicted power consumption.

5. The vehicle control device according to claim 4, wherein the past steering history is a transition of an assist current value of the power steering device, and the engine stop control is prohibited on the basis of a predicted value of the assist current value based on the transition.

6. The vehicle control device according to claim 4, wherein the power steering device generates the assist torque by an electric motor, the past steering history is a transition of an assist current value and a rotation speed of the electric motor, and the engine stop control is prohibited on the basis of a maximum output of the electric motor determined from an output voltage of the electrical storage device of when the engine was started in the past, and a predicted value of the assist current value and a predicted value of the rotation speed of the electric motor based on the transition.

* * * * *